US005132705A

United States Patent [19]

Takeuchi et al.

[11] Patent Number: 5,132,705

[45] Date of Patent: Jul. 21, 1992

[54] RECORDING HEAD INCLUDING ELECTRODE SUPPORTING SUBSTRATE HAVING THIN-WALLED CONTACT END PORTION

[75] Inventors: Yukihisa Takeuchi; Toshikazu Hirota; Shigeki Okada; Natsumi Shimogawa, all of Nagoya, Japan

[73] Assignee: NGK Insulators, Ltd., Japan

[21] Appl. No.: 446,608

[22] Filed: Dec. 6, 1989

[30] Foreign Application Priority Data

Dec. 6, 1988 [JP] Japan ................................ 63-308343
Aug. 21, 1989 [JP] Japan ................................ 1-214624

[51] Int. Cl.[5] ................................ G01D 15/10

[52] U.S. Cl. ................................ 346/76 PH; 346/155; 346/139 C

[58] Field of Search ................................ 346/76 PH, 155

[56] References Cited

U.S. PATENT DOCUMENTS

| | | | |
|---|---|---|---|
| 3,071,685 | 1/1963 | Joyce | 346/155 X |
| 3,124,804 | 3/1964 | Johnson et al. | 346/155 X |
| 3,702,001 | 10/1972 | Gassino et al. | 346/155 X |
| 3,968,500 | 7/1976 | Meisel et al. | 346/139 C |
| 4,082,619 | 4/1978 | Dehnert | 346/165 X |
| 4,233,611 | 11/1980 | Nakano et al. | 346/155 |
| 4,300,146 | 11/1981 | Gustin et al. | 346/155 |
| 4,595,823 | 6/1986 | Sorimachi et al. | 346/76 PH |
| 4,612,433 | 9/1986 | Nagaoka et al. | 346/76 PH X |
| 4,684,960 | 8/1987 | Nishiwaki | 346/76 PH |
| 4,961,078 | 10/1990 | Takeuchi et al. | 346/76 PH |
| 4,965,589 | 10/1990 | Takeuchi et al. | 346/76 PH |
| 4,973,982 | 11/1990 | Nakai et al. | 346/76 PH |
| 4,990,934 | 2/1991 | Takeuchi et al. | 346/76 PH |

FOREIGN PATENT DOCUMENTS

| | | |
|---|---|---|
| 0145942 | 6/1985 | European Pat. Off. . |
| 150579 | 8/1985 | European Pat. Off. . |
| 3008498 | 1/1981 | Fed. Rep. of Germany . |
| 3435999 | 4/1985 | Fed. Rep. of Germany . |
| 3447581 | 7/1985 | Fed. Rep. of Germany . |
| 54-141140 | 11/1979 | Japan . |
| 58-12790 | 1/1983 | Japan . |
| 58-104787 | 6/1983 | Japan . |
| 59-169872 | 9/1984 | Japan . |
| 60-72733 | 4/1985 | Japan . |
| 60-78772 | 5/1985 | Japan . |
| 60-79959 | 5/1985 | Japan . |
| 60-174664 | 9/1985 | Japan . |
| 60-199669 | 10/1985 | Japan . |
| 61-16858 | 1/1986 | Japan . |
| 61-16859 | 1/1986 | Japan . |
| 61-35972 | 2/1986 | Japan . |
| 61-37493 | 2/1986 | Japan . |
| 61-230966 | 10/1986 | Japan . |
| 62-99162 | 5/1987 | Japan . |
| 62-99163 | 5/1987 | Japan . |
| 62-144964 | 6/1987 | Japan . |
| 62-161555 | 7/1987 | Japan . |
| 62-238767 | 10/1987 | Japan . |
| 62-292461 | 12/1987 | Japan . |
| 63-30279 | 2/1988 | Japan . |
| 63-87264 | 4/1988 | Japan . |
| 63-160855 | 7/1988 | Japan . |
| 2059352 | 4/1981 | United Kingdom . |
| 2101935 | 1/1983 | United Kingdom . |

OTHER PUBLICATIONS

"Noble Metal Resistive Ribbon Electrode" IBM Technical Disclosure Bulletin, vol. 27, No. 12, May 1985.
"Silicon-Based Printhead Design" IBM Technical Disclosure Bulletin, vol. 22, No. 12, May 1980.
IBM Technical Disclosure Bulletin, vol. 23, No. 9 Feb. 1981.

*Primary Examiner*—Benjamin R. Fuller
*Assistant Examiner*—Gerald E. Preston
*Attorney, Agent, or Firm*—Parkhurst, Wendel & Rossi

[57] ABSTRACT

A recording head including at least one electrode, and a substrate structure for supporting each electrode. Each electrode and the substrate are held in contact with a recording medium or a planar intermediate member interposed between the recording medium and the recording head, so that an electric current is applied to the recording medium or the intermediate member. The substrate has a distal end portion extending from a proximal portion for contact with the recording medium and the intermediate member. The distal end portion has a constant thickness smaller than that of the proximal portion, as viewed in a direction perpendicular to a direction of extension of the end portion. The distal end portion is made of a material whose wear resistance is lower than that of the electrode.

21 Claims, 7 Drawing Sheets

PRIOR ART

RECORDING HEAD INCLUDING ELECTRODE SUPPORTING SUBSTRATE HAVING THIN-WALLED CONTACT END PORTION

BACKGROUND OF THE INVENTION

1. Field of the Invention

The present invention relates in general to a recording head for recording or printing images such as characters and graphical representations, by applying an electric current to a recording medium or a ribbon or film or other form of intermediate member interposed between the recording medium and the head. More particularly, the invention is concerned with the configuration of a distal end portion of such a recording head at which the head contacts the recording medium or intermediate member.

2. Discussion of the Prior Art

There will be first described prior art recording heads, and problems encountered in these heads. Various types of recording heads for recording by application of an electric current to a recording medium or an intermediate member have been proposed up to the present. In particular, there is known a recording head having a laminar or multi-layer structure which includes a substrate or substrates, and an array of recording electrodes and an array of return circuit electrodes which are supported by or formed on the substrate or substrates. Examples of this type of recording head are disclosed in laid-open Publication Nos. 61-35972, 62-292461, 54-141140, 58-12790 and 61-230966 of unexamined Japanese Patent Applications.

There is known another type of recording head, in which the array of recording electrodes is formed on one of opposite major surfaces of a substrate, as disclosed in laid-open Publication Nos. 58-104787, 61-37493, 63-30279, 63-87264, 63-160855, 60-78772 and 62-238767 of unexamined Japanese Patent Applications.

As disclosed in the publications identified above, the recording head of the types indicated above are adapted such that an electric current is applied to an electrically resistive or conductive layer formed or coated on or carried by a suitable recording medium or a suitable planar intermediate support member in the form of a sheet, film or ribbon. The electrically resistive or conductive layer may be formed on a roller or other support member, or constitute an inner layer of the recording medium or support member. In a recording operation by using an intermediate ribbon or film having an electrically resistive layer and an ink layer, for example, an electric current applied to the resistive layer through the recording head causes Joule heat to be generated by the resistive layer, whereby selected local areas of the ink layer are heated, and the ink material in these heated local areas is fused, vaporized or diffused. As a result, the ink material is transferred to the appropriate local areas of the recording medium so as to form a black or colored image. If an electric current is applied directly to a recording medium, the appropriate local areas of the medium are suitably colored due to Joule heat generated by an electric current, or due to removal of the covering material from the medium surface due to an electrical discharge occurring thereon.

The electrically resistive layer provided on the recording medium or intermediate support member may be an electrically conductive layer, an electrically conductive or resistive ink layer (which serves also as an ink-bearing layer), a heat-sensitive layer having an electrolyte, or any form of layer through which an electric current may flow.

In a recording or printing operation by the recording head for use with the recording medium or intermediate support member as described above, the recording electrodes and the return circuit electrode or electrodes must be held in electrical contact with the electrically resistive layer of the recording medium or support member. To this end, the electrodes used in the known recording heads as disclosed in the publications indicated above are formed of a material which has a higher degree of wear resistance than the material of the substrate structure and an electrically insulating layer used for the heads.

An example of such a known recording head is partly illustrated in FIG. 17, wherein a multi-layer structure is formed by two substrates 11, an array of recording electrode 12 formed on one of the substrates 11, an array of return circuit electrodes 13 formed on the other substrate, and an electrically insulating layer 14 which separates the two arrays of electrodes 12, 13 and to which the electrode arrays 12, 13 are bonded by respective layers of a suitable adhesive 15, 15. In this arrangement, the end face of the substrate structure 11 occupies a considerably large portion of the entire contact face at the distal end of the head which is adapted to contact the surface of the electrically resistive layer of the recording medium or support member. In other words, the area of the contact end faces of the electrodes 12, 13 is comparatively small. This area ratio of the contact end face of the substrate structure 11 and electrodes 12, 13 does not provide for a desired electrical contact between the electrodes and the electrically resistive layer. When a recording operation requires a relatively large contacting force of the electrodes against the resistive layer, the known arrangement is not satisfactory for producing high-quality images.

For improving the electrical contact between the electrodes and the resistive layer of an ink ribbon for example, a recording head having a generally pointed contact end portion is proposed as shown in FIG. 18. While this recording head assures improved electrical contact between the electrodes and the resistive layer during an initial period of use, the ratio of the contact end face area of the substrate structure 11 with respect to that of the electrodes 12, 13 increases as the pointed end of the head wears. Satisfactory contacting of the electrodes with the resistive layer may not be obtained if the worn-out contact end of the head is ground for re-shaping by a relatively easy method while the head remains installed on the relevant recording apparatus.

An alternative known approach is to use the electrodes 12, 13 which have increased thicknesses, as indicated in FIG. 19. This arrangement, however, lowers the efficiency or ease of forming the electrodes in the desired patterns (in the form of mutually spaced apart stripes).

Another type of recording head is illustrated in FIG. 20. This recording head has an array of recording electrodes 12 which is formed on one major surface of the substrate 11 and covered by an electrically insulating layer 7 made of a comparatively soft material. Although the contact of the electrodes 12 and insulating layer 7 with the resistive layer is better than the contact of the multi-layer heads indicated above, the contact end portion of the electrodes 12 comparatively rapidly wears since the head contacts the resistive layer at one edge thereof on the side of the electrode array 12. As the contact edge of the head is worn or ground for re-shaping, the area ratio of the contact end face of the substrate 11 with respect to the contact end face of the electrodes 12 increases, whereby the electrical contact of the electrodes is deteriorated during use of the head.

SUMMARY OF THE INVENTION

It is therefore an object of the present invention to provide a recording head for recording by application of an electric current to a recording medium or an intermediate member interposed between the head and the medium, which recording head assures excellent electrical contact of the electrodes with the medium or intermediate member for a prolonged period of use while at the same time has a sufficient overall mechanical strength.

The above object may be achieved according to the principle of the present invention, which provides a recording head operable to apply an electric current, the recording head comprising (a) at least one type of electrode having at least one electrode, and (b) a substrate structure having at least one substrate for supporting the at least one electrode. Each electrode and each substrate are held in contact with one of a recording medium and a planar intermediate member interposed between the recording medium and the recording head, so that the electric current is applied to the recording medium or the planar intermediate member. Each substrate of the substrate structure includes a proximal portion, and a distal end portion extending from the proximal portion by a predetermined distance for contact with the recording medium or the planar intermediate member. The distal end portion has a thickness smaller than that of the proximal portion, as viewed in a direction perpendicular to a direction of extension of the distal end portion. Further, the distal end portion of each substrate is made of a material whose wear resistance is lower than that of the electrode or electrodes.

The recording head of the present invention constructed as described above provides for excellent or satisfactory electrical contact between the electrode or electrodes and an electrically resistive layer or other layer of the recording medium or planar intermediate member for a prolonged period of use, while at the same time permitting the substrate structure to maintain a sufficient degree of mechanical strength. Thus, the present recording head assures a highly reliable recording operation for improved quality of recorded images.

In one form of the present invention, the recording head further comprises an electrically insulating layer, and the above-indicated at least one type of electrode comprises at least one recording electrode and at least one return circuit electrode. In this case, the substrate structure comprises two substrates which have mutually facing major surfaces on which the at least one recording electrode and the at least one return circuit electrode are formed, respectively. The recording electrode or electrodes and the return circuit electrode or electrodes are spaced apart from each other by the electrically insulating layer in the direction of thickness of the distal end portion of the substrates.

In another form of the invention, the above-indicated at least one type of electrode comprises at least one recording electrode, and the substrate structure comprises one substrate which has opposite major surfaces. In this case, the recording electrode or electrodes is/are formed on one of the opposite major surfaces of the substrate.

In a further form of the invention, the at least one type of electrode comprises at least one recording electrode and at least one return circuit electrode, and the substrate structure comprises one substrate having opposite major surfaces on which the recording electrode or electrodes and the return circuit electrode or electrodes are formed, respectively.

The at least one type of electrode may consist of an array of recording electrodes and an array of return circuit electrodes, which may be formed on respective two major surfaces of the substrate structure. These two major surfaces may be provided by one substrate or respective two substrates as indicated above. In this case, the return circuit electrodes correspond to the recording electrodes. However, a single return circuit electrode may be provided commonly to the recording electrodes.

Each substrate of the present recording head may have a shoulder surface formed adjacent to the distal end portion. The shoulder surface may take suitable configuration. For example, the shoulder surface is formed at right angles to the direction of extension of the distal end portion, or formed as a fillet surface which terminates in a surface of the distal end portion which is parallel to the direction of extension of the distal end portion. Alternatively, the shoulder may be an inclined surface which forms an obtuse angle with respect to a surface of the distal end portion which is parallel to the direction of extension of the distal end portion.

The present recording head was developed on a basic concept that the wear resistance of the head at its distal end including the distal end portion of each substrate is desirably influenced by the wear resistance of the distal end portion of the electrode or electrodes. In other words, the present recording head is constructed so that the substrate structure has a mechanical strength or rigidity necessary to support the electrode or electrodes, while the distal end portion of the substrate structure has a sufficiently reduced thickness for improved electrical contact of the electrode or electrodes with the recording medium or intermediate support member. Further, the present recording head is constructed on a concept that the thickness of the distal end portion of the substrate structure is preferably constant in the direction of extension from the proximal portion, i.e., in the direction in which the distal end portion wears. Namely, it is desirable that the thickness of only the distal end portion at which the substrate structure contacts the recording medium (sheet of paper) or intermediate member (ink ribbon or film) is small and constant, so that the substrate structure has sufficient mechanical strength and permits easy installation of the recording head, and so that the recording medium or intermediate member may contact only the electrode or electrodes as much as possible.

BRIEF DESCRIPTION OF THE DRAWINGS

The above and optional objects, features and advantages of the present invention will be better understood by reading the following description of presently preferred embodiments of the invention, when considered in conjunction with the accompanying drawings, in which.

DETAILED DESCRIPTION OF THE PREFERRED EMBODIMENTS

Figure 1:
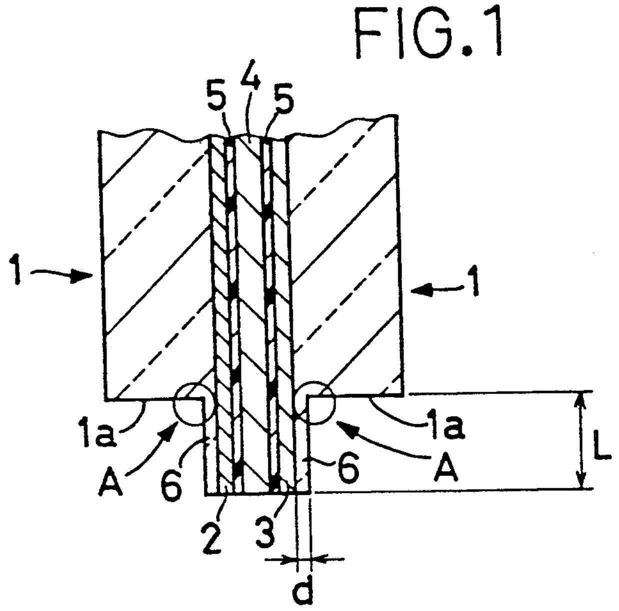
FIGS. 1-6 and FIGS. 9, 10, 14 and 16 are explanatory elevational views in cross section of different forms of a recording head of the present invention, taken in a plane parallel to the direction of extension of the electrodes.
Figure 2:
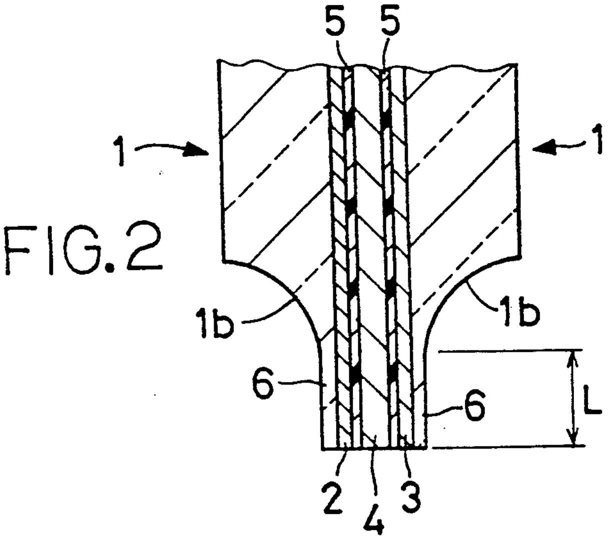
Figure 3:
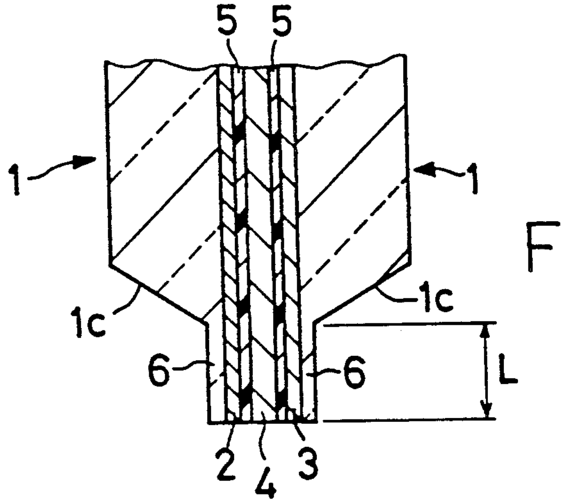

Referring first to FIGS. 1-3, there are shown three different forms of the recording head constructed according to the present invention, which have a laminar or multi-layer structure. Each of these recording heads of FIGS. 1-3 includes a substrate structure 1, an array of recording electrodes 2, an array of return circuit electrodes 3, an electrically insulating layer 4, and two layers of an adhesive 5, 5. The substrate structure consists of two substrates 1, 1 each of which has opposite major surfaces. The array of recording electrodes 2 is formed on one of the opposite major surfaces of one of the two substrates 1, while the array of return circuit electrodes 3 is formed on one of opposite major surfaces of the other substrate 1 which faces the major surface of the above-indicated one substrate 1 on which the array of recording electrodes 2 is formed. The electrically insulating layer 4 separates the two arrays of electrodes 2, 3 in the direction of thickness thereof, and the adhesive layers 5, 5 are interposed between the electrode arrays 2, 3 and the insulating layer 4, so that the electrodes arrays 2, 3 are bonded to the insulating layer 4 by the interposed adhesive layers 5, 5.

Figure 4:
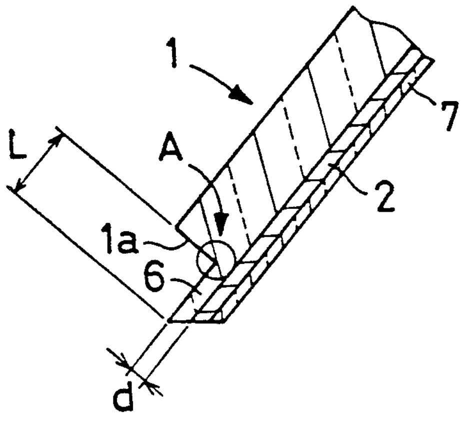
Figure 5:
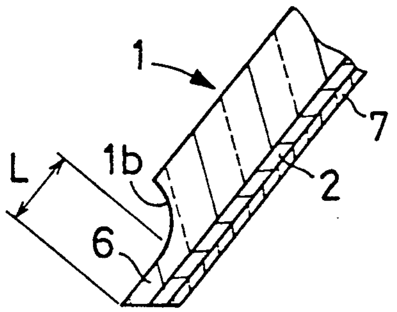
Figure 6:
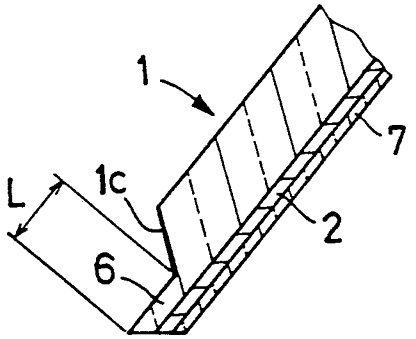

Referring next to FIGS. 4-6, there are shown different forms of the recording head in which the substrate structure consists of a single substrate 1 which supports an array of recording electrodes 2 formed on one of a major surface thereof. In these recording heads, the array of recording electrodes 2 is covered by a covering layer 7 made of a relatively soft electrically insulating material such as a synthetic resin, a ceramic material or a glass material. The synthetic resin may be epoxy resin or polyimide, and the ceramic material may be boron nitride or silica. The insulating material must be soft enough to avoid a substantial problem in terms of contact of the covering layer 7 with a recording medium or an intermediate member interposed between the recording head and the recording medium.

In each of the recording heads shown in FIGS. 1-6, each substrate 1 has a proximal portion (upper portion as viewed in the figures) which is located remote from the recording medium during operation of the head, and a thin-walled distal end portion 6 (lower portion as viewed in the figures) which extends from the proximal portion by a suitable length or distance (indicated at L in the figures) in the direction toward the recording medium. The distal end portion 6 has a thickness "d" which is smaller than that of the proximal portion, as viewed in the direction perpendicular to the direction of extension of the portion 6. This thin-walled distal end portion 6 is adapted so that the end face in which the electrodes 2, 3 (2) are exposed contacts the electrically resistive layer provided on the recording medium or ink ribbon (provided as the planar intermediate support member).

The thin-walled distal end portion 6 is formed by providing the substrate 1 with a shoulder surface 1*a*, 1*b*, 1*c*, which is formed adjacent to the proximal end of the distal end portion 6, as shown in FIGS. 1-6. As indicated at "A" in FIG. 1, the shoulder surface 1*a*, 1*b*, 1*c* terminates in the proximal end of the distal end portion 6. In the recording head of FIG. 1, each of the two substrate 1 of the substrate structure has the shoulder surface 1*a* which is perpendicular to the direction of extension of the distal end portion 6, i.e., parallel to the direction of thickness "d" of the distal end portion 6. In the recording head of FIG. 4, the single substrate 1 has the shoulder surface 1*a* similar to that of FIG. 1.

The shoulder surface need not be at right angles to the direction of extension of the thin-walled end portion 6. In the recording head of FIG. 2, each of the two substrates 1 has the shoulder surface 1*b* which is a fillet having a suitable radius of arc and which terminates in the surface of the distal end portion 6 parallel to the direction of extension. In the recording head of FIG. 5, the shoulder surface 1*b* is provided for the single substrate 1.

Figure 7:
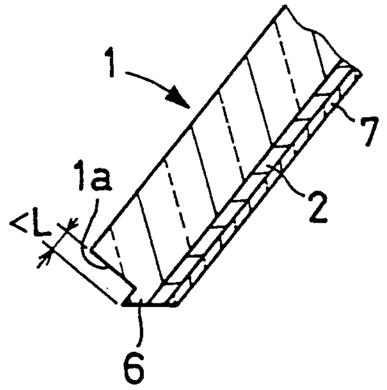
FIG. 7 is an explanatory elevational view in cross section of the recording head of FIG. 7 whose distal end portion is worn out.

In the recording head of FIG. 3, each of the two substrates 1 has the inclined shoulder surface 1*c* which forms an obtuse angle with respect to the surface of the distal end portion 6 which is parallel to the direction of extension. In the recording head of FIG. 6, the single substrate 1 has the inclined shoulder surface 1*c* similar to that of FIG. 3. FIG. 7 shows the distal end portion 6 of the recording head of FIG. 4, which has a reduced length due to wear.

Figure 9:
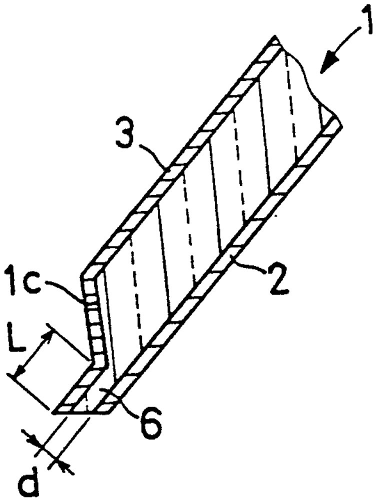
Figure 10:
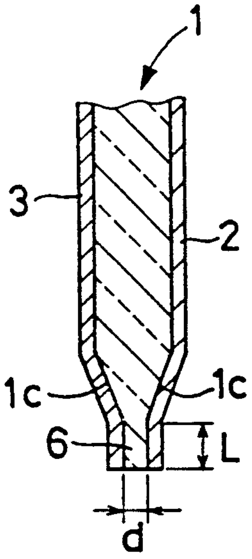

Referring to FIGS. 9 and 10, two further different forms of recording head are shown. In these recording heads, a single substrate 1 has opposite major surfaces on which the arrays of recording electrodes and return circuit electrodes 2, 3 are formed, respectively. In the recording head of FIG. 9, the inclined shoulder surface 1*c* is formed adjacent to the thin-walled distal end portion 6. In the recording head of FIG. 10, the two inclined shoulder surfaces 1*c* are formed adjacent to the thin-walled distal end portion 6 such that the distal ends of the two inclined shoulder surfaces 1*c* define the thickness "d" of the end portion 6.

The thickness "d" of the thin-walled distal end portion 6 of the substrate 1, and the length "L" of the distal end portion 6 (which is shortened as the end portion 6 wears) arc determined by the materials of the substrate structure 1, electrodes 2, 3, and by the required properties or characteristics to be exhibited by the distal end portion 6 during a recording operation, and are further determined by the desired force of electrical contact between the electrodes 2, 3 and the resistive layer of the recording medium or ink ribbon. Generally, the thickness "d" is desirably 700 μm or smaller, preferably within a range of 30-400 μm, and more preferably within a range of 30-100 μm. The length "L" of the distal end portion 6 is desirably held within a range of 50-4000 μm, preferably within a range of 100-1000 μm. The desirability of holding the thickness and length within the above-indicated ranges was confirmed by experiments in which the wear condition of specimen recording heads was observed.

It is desirable that the material for the substrate structure 1 be an electrically insulating material which has a comparatively low resistance to wear and provides a mechanical strength sufficient to support the electrodes 2, 3, and which may be easily processed for shaping the distal end portion 6 with high precision. The electrically insulating material used for the substrate structure 1 preferably consists of a ceramic material having lower degrees of hardness and wear resistance than that of the electrodes 2, 3. For easy shaping of the distal end portion 6 and sufficient mechanical strength, it is particularly desirable to form the substrate structure 1 of a material selected from the group which consists of: highly machinable glass ceramic containing mica; boron nitride; highly machinable ceramic containing boron nitride; highly machinable ceramic containing aluminum nitride and boron nitride. In particular, the machinable glass ceramic containing mica is preferably used.

Figure 17:
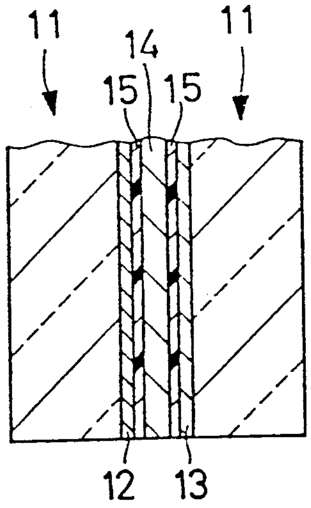
FIGS. 17 through 20 are explanatory elevational view in cross section of known recording heads, taken in a plane parallel to the direction of extension of the electrodes.
Figure 18:
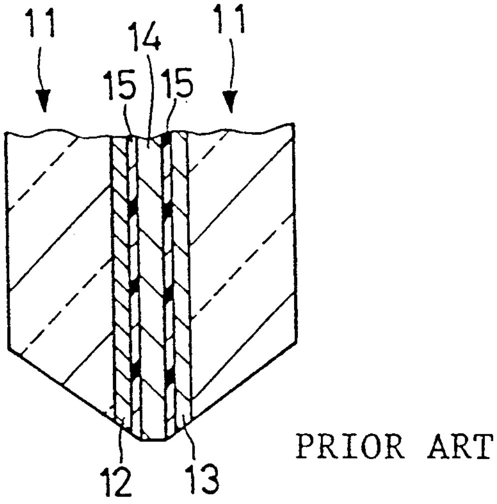
PRIOR ART FIG.18
Figure 19:
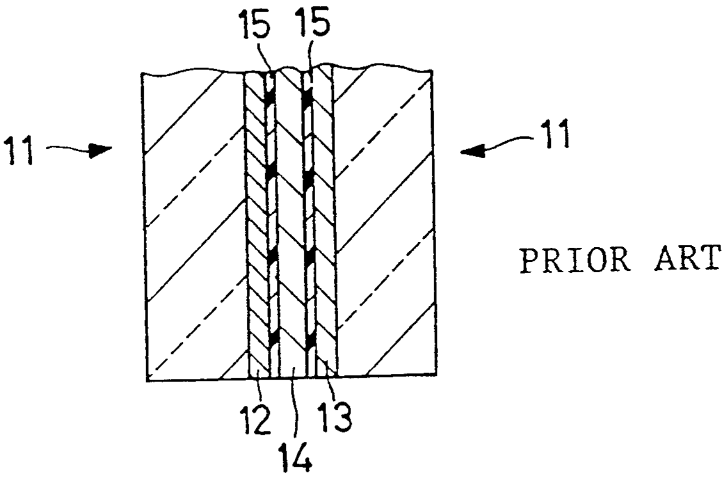
PRIOR ART FIG.19
Figure 20:
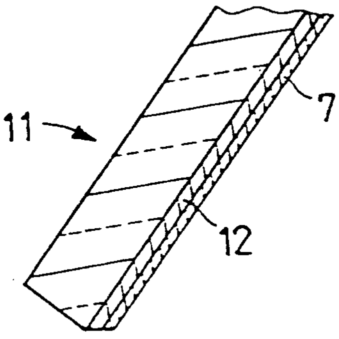
PRIOR ART FIG.20
Figure 21:
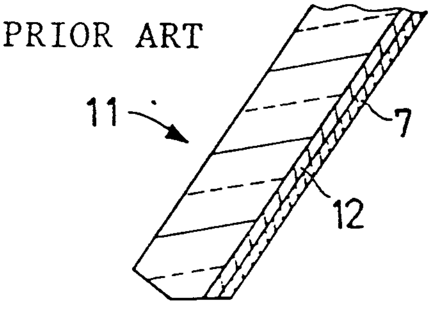
FIG.21 PRIOR ART
FIG. 21 is an elevational cross sectional view of the recording head of FIG. 20 whose distal end portion is worn out.

The shaping of the substrate structure 1 for forming the thin distal end portion 6 may be formed before the electrodes (recording electrodes 2 and/or return circuit electrodes 3) are formed on the substrate structure. Where a substrate 1 has the electrodes 2 or 3 formed on one of the opposite major surfaces, the distal end portion 6 may be formed by a grinding, slicing or other suitable machining operation, after a laminar structure as illustrated in FIGS. 17 and 20 are prepared. Where a substrate 1 has the recording and return circuit electrodes 2 and 3 formed on the respective opposite major surfaces thereof as illustrated in FIGS. 9 and 10, it is usual that the substrate 1 is first subjected to the suitable shaping operation to form the distal end portion 6, and then the electrodes 2, 3 are formed on the shaped substrate 1.

Figure 8:
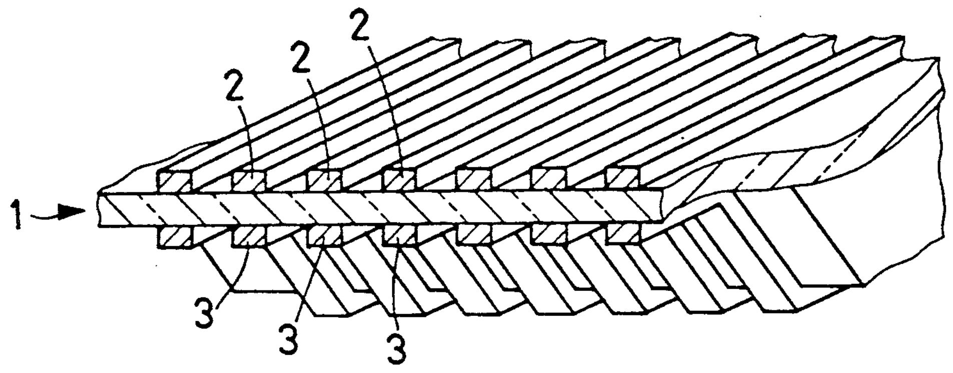
FIG. 8 is a perspective view showing the distal end portion of another form of the recording head of the invention.

Referring to the perspective view of FIG. 8, the single substrate 1 has the recording electrode array 2 on one of its major surfaces, and the return circuit electrode array 3 on the other major surface. The distal end portion of this recording head of FIG. 8 which includes the distal end portion 6 of the substrate 1 is shown in FIG. 9, which is a cross sectional view taken in a plane which is parallel to the direction of extension of the electrodes 2, 3 and perpendicular to the plane of the substrate 1. The thickness "d" of the distal end portion 6 is 70 μm, and the length "L" of the same is 300 μm.

It will be understood that the substrate 1 of the recording head of FIGS. 8 and 9 also serves as a layer for electrically insulating the recording electrodes 2 and the return circuit electrodes 3 from each other. Thus, this embodiment of FIGS. 8 and 9 eliminates the relatively exclusive electrically insulating layer 4 required in the embodiments of FIGS. 1-3 described above and in an embodiment of FIG. 11. In the absence of the electrically insulating layer 4 which is relatively thin over its entire area and interposed between the two arrays of electrodes 2, 3, the recording head of FIGS. 8 and 9 is desirable in terms of the ease of handling and mechanical strength.

In the recording head of FIG. 10 similar to the head of FIGS. 8 and 9, the substrate 1 functions also as an electrically insulating layers for the electrodes 2, 3. In this embodiment of FIG. 10, the opposite major surfaces of the single substrate 1 should be shaped to provide the inclined shoulder surfaces 1*c*, 1*c* for forming the distal end portion 6. In this respect, the recording head of FIGS. 8 and 9 is advantageous over the recording head of FIG. 10 having one inclined shoulder surface 1*c*, since the former head may be easily shaped with comparatively high dimensional accuracy.

In the recording heads of FIGS. 8-10, it may be preferable to reinforce the head structure for improving the thin distal end portion 6, by providing the substrate 1 or electrodes 2, 3 with a suitable covering layer for covering the surfaces of the substrate or electrodes. The covering layer may be formed of an electrically insulating material such as epoxy resin, polyimide and other synthetic resins, boron nitride, silica and other ceramic materials, or glass materials. The covering layer may be replaced by a thin film or sheet of a highly machinable glass ceramic material, highly machinable ceramic material, or metallic material, which is bonded to the substrate 1 or electrode arrays 2, 3. This film or sheet may be a metallic sheet coated with an electrically insulating material.

If the recording heads of FIGS. 8-10 in which the substrate 1 serves also as the insulating layers for the electrodes 2, 3 considerably suffer from accumulation of heat at the thin distal end portion 6, it is possible and desirable to provide a suitable reinforcing film or sheet which is formed principally of a highly thermally conductive material such as a metallic material, boron nitride and aluminum nitride, so that this film or sheet serves as a heat-dissipating layer as indicated at 8 in FIGS. 13-16. In these figures, reference numeral 5 designates an adhesive, while reference numeral 7 designates an electrically insulating layer.

The recording and return circuit electrodes 2, 3 are formed of an electrically conductive material which has a higher degree of wear resistance than the substrate structure 1 for supporting the electrodes, or than the electrically insulating layer 4. Preferably, a major content of the electrically conductive material for the electrodes 2, 3 is selected from the group which includes: metals such as chromium, titanium, tantalum and zirconium; alloys containing these metals; and compounds of the metals. These materials are advantageously used owing to their comparatively high wear resistance and comparatively low rate of consumption due to an electrical effect during use of the head. Particularly, chromium, and an alloy or a compound containing chromium are preferably used as a major component of the electrically conductive material for the electrodes. More preferably, the electrodes are formed principally of an alloy or compound containing chromium and nitrogen.

The thickness of the recording and return circuit electrodes 2, 3 is preferably at least 1 μm. The electrodes 2, 3 may be plated with nickel, tin, copper, gold or other suitable metal, as required.

Figure 11:
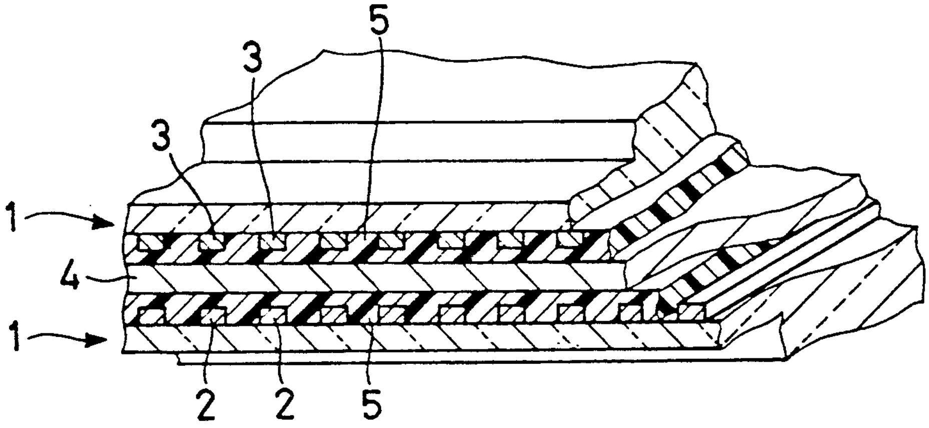
FIG. 11 is a perspective view schematically illustrating the distal end portion of the recording head of FIG. 1.

Referring next to FIG. 11, there is schematically shown in perspective a laminar structure of the recording head of FIG. 1. It will be understood that the cross sectional view of FIG. 1 is taken in a plane which is parallel to the direction of extension of the electrodes 2, 3 and perpendicular to the plane of the substrates 1. In this specific embodiment of FIGS. 1 and 11, the two substrates 1 of the substrate structure are formed of a highly machinable glass ceramic material containing mica, and the electrode arrays 2, 3 are formed by first applying by sputtering respective chromium layers on the appropriate major surfaces of the respective substrates 1, and photoetching the chromium layers in predetermined patterns such that a plurality of chromium strips for each of the two electrode arrays 2, 3 extend parallel to each other and are spaced apart from each other in the direction perpendicular to the direction of extension of the chromium strips. Then, the formed spaced-apart chromium strips are heat-treated in an atmosphere which contains a nitrogen gas and a hydrogen gas. The formed array of the recording electrodes 2 consists of 480 chromium strips which are arranged at a spacing pitch of 170 μm, and each of the chromium strips has a width of 100 μm and a thickness of 6 μm. The two substrates 1, 1 having the electrode arrays 2, 3 are bonded together by the adhesive layers 5, with the electrically insulating layer 4 interposed between the two electrode arrays 2, 3 (two substrates 1, 1). The insulating layer 4 consists of an integrated or foliated mica sheet having a thickness of 100 μm. The thin distal end portion 6 (FIG. 1) of each substrate 1 has a thickness "d" of 100 μm, and a length "L" of 2000 μm.

Figure 12:
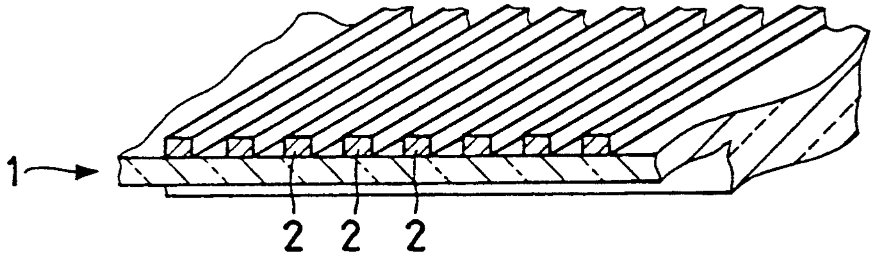
FIG. 12 is a perspective view schematically illustrating the distal end portion of the recording head of FIG. 4.
Figure 13:
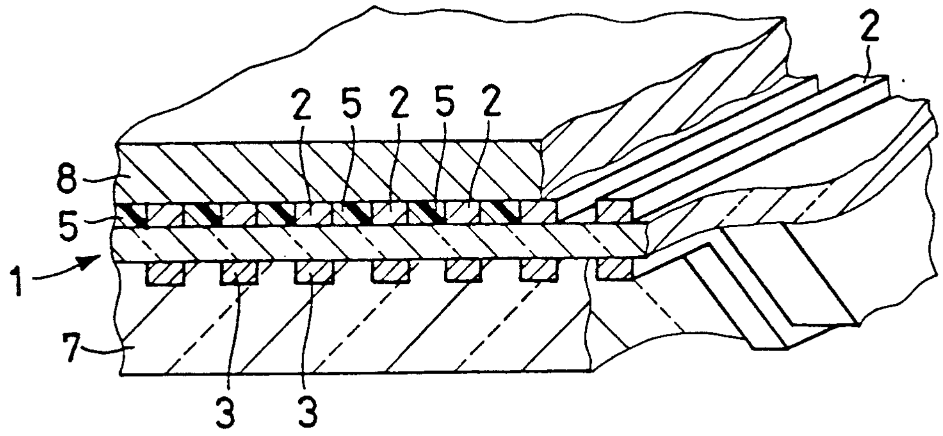
FIGS. 13 and 15 are perspective views schematically showing the recording heads of FIGS. 14 and 16, respectively.
Figure 14:
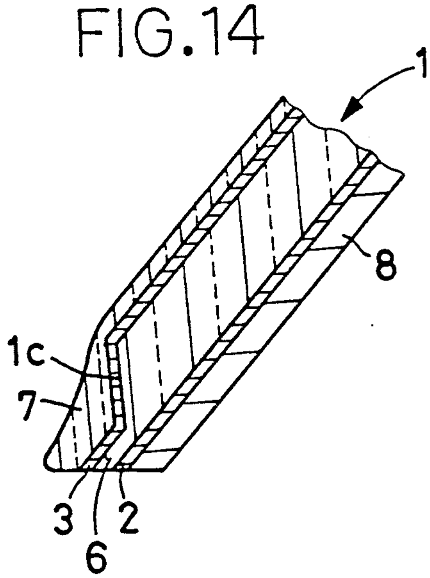
Figure 15:
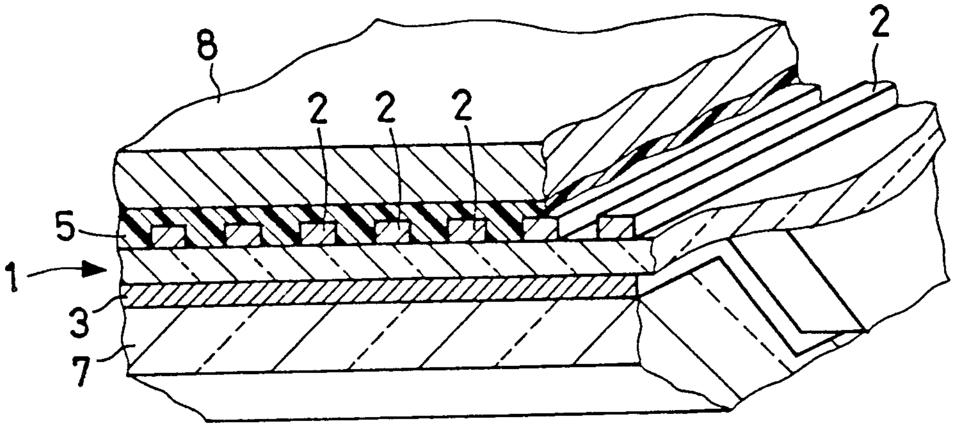
Figure 16:
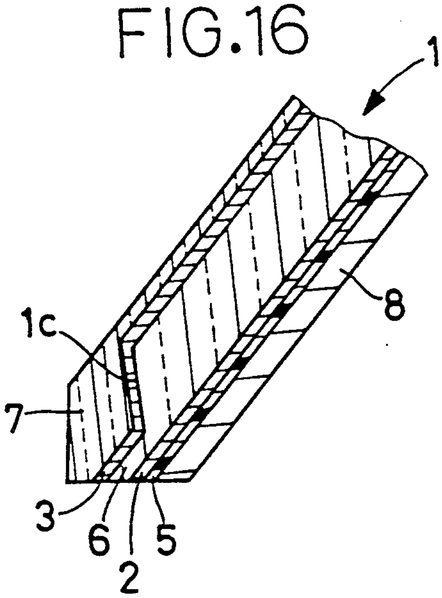

A recording head different in structure from that of FIG. 11 is schematically illustrated in FIG. 12, and in the cross sectional view of FIG. 4. As shown in these FIGS. 4 and 12, this recording head uses one substrate 1 consisting of a highly machinable glass ceramic sheet. On one of the opposite major surfaces of this substrate 1, there is formed the array of the recording electrodes 2 in the same manner as described with respect to the embodiment of FIGS. 1 and 11. The distal end portion 6 (FIG. 4) has a thickness "d" of 100 μm, and a length "L" of 500 μm.

The different forms of the recording head which have been described above were tested as incorporated in a recording apparatus, such that the electrodes 2, or the electrodes 2 and 3 were held in sliding contact with an electrically resistive layer of an ink ribbon, during repetitive printing cycles. The quality of the images printed by the individual recording heads were evaluated. The test revealed satisfactory results obtained from all the tested specimens, i.e., sufficiently high density and clearness or crispness of the printed images, and excellent state of contacting of the electrodes 2, 3 with the resistive layer of the ink ribbon. FIG. 7 shows the recording head of FIG. 4 whose distal end portion 6 has been worn out. As indicated in FIG. 7, the ratio of the contact area of the substrate 1 with respect to that of the electrode 2 remains unchanged even after the wearing of the distal end portion 6. Namely, the distal end portion 6 maintains the initial contacting state for a long period of use.

While the present invention has been described in detail in its presently preferred embodiments referring to the accompanying drawings, it is to be understood that the invention is not construed to be limited to the details of the illustrated embodiments, but that the invention may be embodied with various changes, modifications and improvements, which may occur to those skilled in the art, without departing from the spirit and scope of the invention defined in the following claims.

What is claimed is:

1. A recording head operable to apply an electric current, comprising at least one type of electrode having at least one electrode, and a substrate structure having at least one substrate for supporting said at least one electrode, said at least one electrode and said at least one substrate being held together in direct contact with one of a recording medium and a planar intermediate member interposed between the recording medium and the recording head, so that the electric current is applied to the recording medium or the planar intermediate member, wherein the improvement comprises:

each of said at least one substrate of said substrate structure including a proximal portion, and a distal end portion extending from said proximal portion by a predetermined distance for direct contact with said one of said recording medium and the planar intermediate member, said distal end portion having a constant thickness smaller than that of said proximal portion, as viewed in a direction perpendicular to a direction of extension of said distal end portion wherein said constant thickness of said distal end portion provides a substantially constant contact area with said one of said recording medium and the planar intermediate member as said distal end portion wears from contact with said one of said recording medium and the planar intermediate member; and said distal end portion being made of a material whose wear resistance is lower than that of said at least one electrode.

2. A recording head according to claim 1, further comprising an electrically insulating layer, and wherein said at least one type of electrode comprises at least one recording electrode and at least one return circuit electrode, and said substrate structure comprises two substrates which have mutually facing major surfaces on which said at least one recording electrode and said at least one return circuit electrode are formed, respectively, said at least one recording electrode and said at least one return circuit electrodes being spaced apart from each other by said electrically insulating layer in the direction of thickness of said distal end portion of each of said two substrate.

3. A recording head according to claim 1, wherein said at least one type of electrode comprises at least one recording electrode, and said substrate structure comprises one substrate which has opposite major surfaces, said at least one recording electrode being formed on one of said opposite major surfaces of said one substrate.

4. A recording head according to claim 1, wherein said at least one type of electrode comprises at least one recording electrode and at least one return circuit electrode, and said substrate structure comprises one substrate having opposite major surfaces on which said at least one recording electrode and said at least one return circuit electrode are formed, respectively.

5. A recording head according to claim 1, wherein said at least one type of electrode comprises an array of recording electrodes and an array of return circuit electrodes, and said substrate structure comprises at least two major surfaces on which said arrays of recording electrodes and return circuit electrodes are formed, respectively.

6. A recording head according to claim 1, wherein said each substrate of said substrate structure has a shoulder surface formed adjacent to said distal end portion.

7. A recording head according to claim 6, wherein said shoulder surface is perpendicular to said direction of extension of said distal end portion.

8. A recording head according to claim 6, wherein said shoulder surface is a fillet surface which terminates in a surface of said distal end portion which is parallel to said direction of extension of said distal end portion.

9. A recording head according to claim 6, wherein said shoulder surface is an inclined surface which forms an obtuse angle with respect to a surface of said distal end portion which is parallel to said direction of extension of said distal end portion.

10. A recording head according to claim 1, wherein said substrate structure has at least one shoulder surface formed adjacent to said distal end portion.

11. A recording head according to claim 10, wherein said substrate structure consists of two substrates, and said at least one shoulder surface consists of two shoulder surfaces each formed adjacent to said distal end portion of a corresponding one of said two substrates.

12. A recording head according to claim 10, wherein said substrate structure consists of one substrate, and said at least one shoulder surface consists of one shoulder surface formed adjacent to said distal end portion of said one substrate.

13. A recording head according to claim 10, wherein said substrate structure consists of one substrate, and said at least one shoulder surface consists of two shoulder surfaces each formed adjacent to said distal end of said one substrate.

14. A recording head according to claim 1, wherein said constant thickness of said distal end portion is 700μm or smaller.

15. A recording head according to claim 14, wherein said constant thickness of said distal end portion is within a range of 30–400 μm.

16. A recording head according to claim 1, wherein said predetermined distance is within a range of 50–4000 μm.

17. A recording head according to claim 16, wherein said predetermined distance is within a range of 100–1000 μm.

18. A recording head according to claim 1, wherein each of said at least one substrate of said substrate structure is made of a highly machinable ceramic material.

19. A recording head according to claim 1, wherein each of said at least one electrode is made of an electrically conductive material whose major component consists of a metal containing at least one material selected from the group consisting of chromium, titanium, tantalum and zirconium, or a compound thereof.

20. A recording head according to claim 1, further comprising an insulating layer which covers said at least one electrode.

21. A recording head according to claim 1, further comprising a heat-dissipating layer which covers at least a portion of said at least one electrode.

* * * * *